US008070190B2

(12) United States Patent
Pires Cabado et al.

(10) Patent No.: US 8,070,190 B2
(45) Date of Patent: Dec. 6, 2011

(54) SECURITY SPLICING SYSTEM OF ALIGNED PIPES, AGAINST THE EXPANSION AND/OR CONTRACTION THEREOF

(76) Inventors: Elisabet Patricia Pires Cabado, Alella (ES); Barbara Ines Pires Cabado, Alella (ES)

( * ) Notice: Subject to any disclaimer, the term of this patent is extended or adjusted under 35 U.S.C. 154(b) by 20 days.

(21) Appl. No.: 12/400,103

(22) Filed: Mar. 9, 2009

(65) Prior Publication Data

US 2009/0230672 A1  Sep. 17, 2009

(30) Foreign Application Priority Data

Mar. 11, 2008  (ES) .................................. 200800702

(51) Int. Cl.
*F16L 23/00*  (2006.01)
(52) U.S. Cl. ........................... 285/373; 285/15; 285/368
(58) Field of Classification Search .................... 285/15, 285/373, 420, 368, 412
See application file for complete search history.

(56) References Cited

U.S. PATENT DOCUMENTS

| 307,648 | A | * | 11/1884 | Holland et al. | 285/420 |
|---|---|---|---|---|---|
| 1,498,855 | A | * | 6/1924 | Parker | 285/412 |
| 2,776,153 | A | * | 1/1957 | Smith | 285/373 |
| 3,836,182 | A | * | 9/1974 | Miller | 285/368 |
| 3,907,341 | A | * | 9/1975 | Schoepe | 285/371 |
| 4,119,335 | A | * | 10/1978 | Rieffle et al. | 285/368 |
| 4,336,959 | A | * | 6/1982 | Roche | 285/368 |
| 4,492,391 | A | * | 1/1985 | Haines | 285/368 |
| 4,502,189 | A | * | 3/1985 | Sieberkrob et al. | 285/373 |
| 4,575,129 | A | * | 3/1986 | Porowski | 285/15 |
| 4,635,970 | A | * | 1/1987 | Haines | 285/368 |
| 4,749,215 | A | * | 6/1988 | Martin | 285/373 |
| 5,026,096 | A | * | 6/1991 | Lutz, II | 285/373 |
| 5,090,742 | A | * | 2/1992 | Cohen et al. | 285/373 |
| 5,190,324 | A | * | 3/1993 | Bird et al. | 285/368 |
| 5,209,524 | A | * | 5/1993 | Corwon et al. | 285/368 |
| 5,273,322 | A | * | 12/1993 | Straub | 285/373 |
| 5,468,025 | A | * | 11/1995 | Adinolfe et al. | 285/420 |
| 5,755,464 | A | * | 5/1998 | Erwin | 285/367 |
| 5,772,257 | A | * | 6/1998 | Webb et al. | 285/373 |
| 5,876,146 | A | * | 3/1999 | Deaver et al. | 285/15 |
| 6,065,784 | A | * | 5/2000 | Lundstrom | 285/368 |
| 6,070,914 | A | * | 6/2000 | Schmidt | 285/373 |
| 7,384,076 | B2 | * | 6/2008 | Bradley | 285/373 |
| 7,661,731 | B2 | * | 2/2010 | Bradley | 285/373 |
| 7,748,753 | B2 | * | 7/2010 | Krausz et al. | 285/373 |

FOREIGN PATENT DOCUMENTS

| ES | 2 212 732 | 7/2004 |
|---|---|---|
| GB | 2 393 768 | 4/2004 |

* cited by examiner

*Primary Examiner* — David E Bochna
(74) *Attorney, Agent, or Firm* — Michael J. Striker

(57) ABSTRACT

A security splicing system of aligned pipes against an expansion and/or contraction thereof due to variations in temperatures, has a flange unit providing a stability and watertightness of a splice, and including a double flange with two identical fastening elements gripping an outer face of an end area of two previously spliced pipes with a watertight connecting flange, so that an accidental displacement of the watertight connecting flange is prevented in an event that dimensions of the end area of the pipes vary due to an expansion or contraction.

2 Claims, 2 Drawing Sheets

SECURITY SPLICING SYSTEM OF ALIGNED PIPES, AGAINST THE EXPANSION AND/OR CONTRACTION THEREOF

CROSS-REFERENCE TO RELATED APPLICATION

The invention described and claimed hereinbelow is also described in Spanish Patent Application ES 2008 00702 filed on Mar. 11, 2008. This Spanish Patent Application, whose subject matter is incorporated here by reference, provides the basis for a claim of priority of invention under 35 U.S.C. 119(a)-(d).

BACKGROUND OF THE INVENTION

The present patent relates to a security splicing system of aligned pipes, against the expansion and/or contraction thereof.

More particularly, the present patent relates to a system devised to carry out the splicing of piping with identical diameters and situated aligned one with respect to the other, featuring as its essential characteristic that the watertightness achieved by means of the splice with suitable flanges will not be altered by expansions and/or contractions that the aforementioned piping may suffer due to changes in temperature. The elements which constitute the system are described below.

The use of prefabricated piping is generalized for the construction or installation of fluid pipes, both liquid and gas, at various pressures, often high, for requirements of the type of pipe or transport to be carried out and for the characteristics of the fluid to conduct or transport.

This piping can be supplied in factory-produced sections, of several dozen metres, so that the time necessary to lay the piping is relatively short. This piping is preferably manufactured in polyethylene, a material of optimal characteristics for the transport of different fluids, and especially aggressive liquids and/or gases, including the United Nation's list of hazardous materials.

However, a basic and characteristic element of these installations are flanges and fastenings that are used for the joining or splicing of two pipes, aligned and of equal diameter, flanges and fastenings of various types that grip both ends of the pipes to splice and which must guarantee the watertightness of that splice, especially if the phenomenon of expansion/contraction due to changes in temperature and the drawbacks that can arise in that spliced area are taken into consideration, since the movements caused by the expansion/contraction will directly affect the position of the flange/fastening device, and can bring about leaks due to the loss of watertightness in that place, with the ensuing danger.

The system being disclosed and which is object of the present invention completely eliminates the possibility of the excessive movement of the flange/fastening placed on the two aligned ends of the piping that has been joined, guaranteeing the stability of that area and the impossibility that any leak due to an improbable movement of said flange/fastening occurs.

Patent ES200202246 (M. J. Pires) discloses flanges for the splicing of piping with smooth ends which achieve watertightness with help from metal rings which support and drive into the piping surface, providing that most of them increase the number of fixed vertices and, therefore, improve the watertightness.

If the function desired is obviously correct, the difficulty arises when the piping to be spliced expands or contracts, given that especially those made of propylene increase in length with heat and shrink in cold.

SUMMARY OF THE INVENTION

Accordingly, it is an object of the present invention to provide a security splicing system of aligned pipes, against the expansion and/or contraction thereof which avoids the disadvantages of the prior art.

The system to be protected with the present invention consists of the incorporation of a double flange, formed by two fastening elements, solidly joined by means of rods, parallel to each other and to the common axis of both pipes to be spliced, elements which will be strongly fastened on the outer surface of said pipes, slightly behind the classic and known flange/fastening position, which hereinafter will be called "watertight connecting flange", of the ends of the two above-mentioned pipes.

The purpose of this double flange is to always keep the distance of the piping areas whereupon each one of the two fastening elements which compose it are fastened the same, and in this manner maintain the end edges of said piping at the same distance.

This action will guarantee and allow that, in the case that a longitudinal variation of the facing ends of the pipes already spliced is produced due to expansion, which would possibly cause a movement of the watertight connecting flange, at no time can this watertight connecting flange be moved beyond a pre-established limit because of the solid connection rods of both fastening elements, and which will specifically be the limit of the movement which would cause the removal of this watertight connecting flange and, consequently, the loss of the watertightness of the connection and the dangerous and inadmissible leakage of fluid in that place. This situation must be considered both if the changes in temperature cause expansion or contraction of the piping.

The characteristics of the double flange, as well as of its two fastening elements and of the connection rods, are described below.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

In accordance with the drawings, the security splicing system of piping -1- and -1*a*-, aligned and of equal diameter, against the expansion and/or contraction thereof that they may suffer from due to changes in temperature, is based on the application of a double flange constituted by two identical fastening elements -2- and -2*a*- which will grip the outer face of both pipes -1- and -1*a*-, already spliced in a completely correctly manner, with total guarantee of watertightness, by means of the watertight connecting flange -3- positioned on both ends -4- and -4*a*- of those already spliced pipes, a watertight connecting flange -3- of known characteristics and application.

Figure 2:
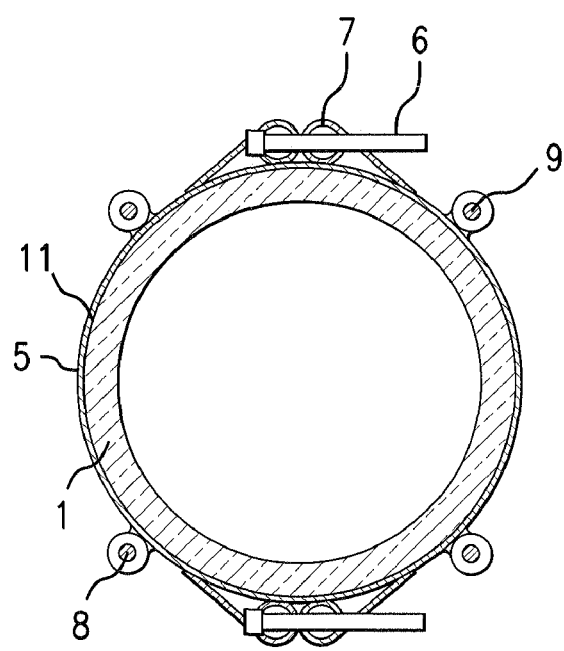
FIG. 2 is an AA sectional view of one of the spliced pipes, corresponding to one of the two fastening elements which constitute the double flange.
Figure 3:
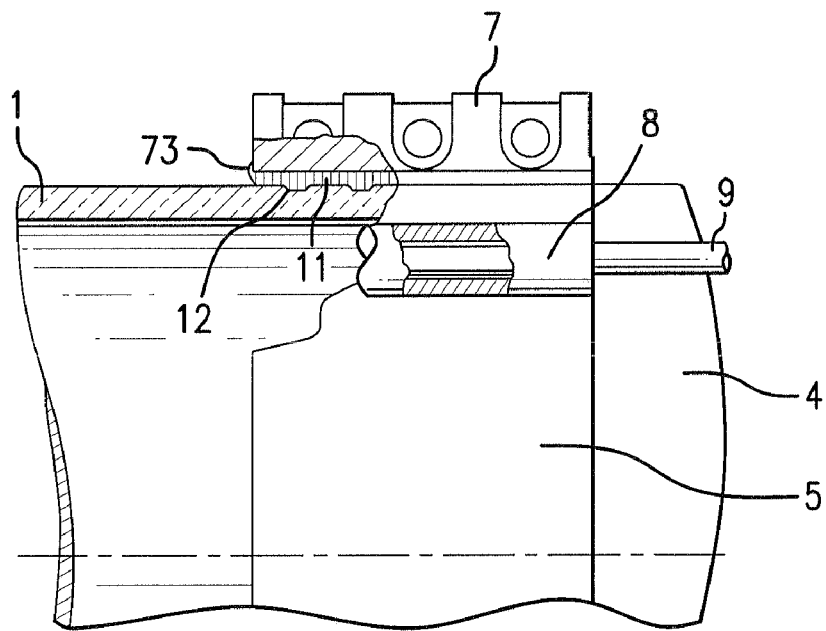
FIG. 3 is a close-up, on a larger scale and duly sectioned, of the placement of one of the two fastening elements which compose the double flange, showing the fastening and attachment thereof on the outer face of the pipe.
Figure 4:
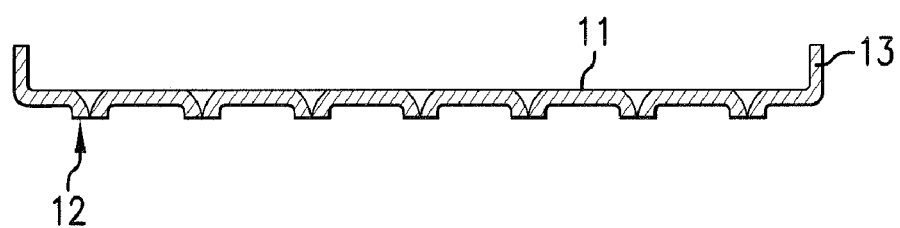
FIG. 4 is a close-up, also on a larger scale and sectioned, of the fastening profile located inside each one of the two fastening elements which constitute the double flange.
Figure 5:
FIG. 5 is an illustrative view of one of the connecting rods of the two component elements of the double flange.

Each one of the two fastening elements -2- and -2*a*- is constituted by an exterior clasp -5- by means of pressure screws -6- which actuate on the corresponding closures -7-, one or more, according to the diameter of the pipes, said exterior clasp -5- being provided with hollow cylinders -8-, situated longitudinally, parallel to each other and to the common axis of the pipes -1- and -1*a*-, and of variable number, through whose interior are disposed the connecting rods -9-, of variable number, but four in the example represented in FIG. 2, all of that identical in both elements -2- and -2*a*- whose cylinders -8- are positioned in identical angular branching.

The connecting rods -9- are cylindrical and smooth, except their ends -9*a*-, which are threaded and which will remain situated outside of the corresponding hollow cylinders, -8- which position them, so that the hold-down nuts -10- can be situated on these threaded ends, nuts which, locked against the hollow cylinders -8-, will fix the relative position between the two fastening elements, -2- and -2*a*-, of the double flange, so that they cannot separate or move.

Figure 1:
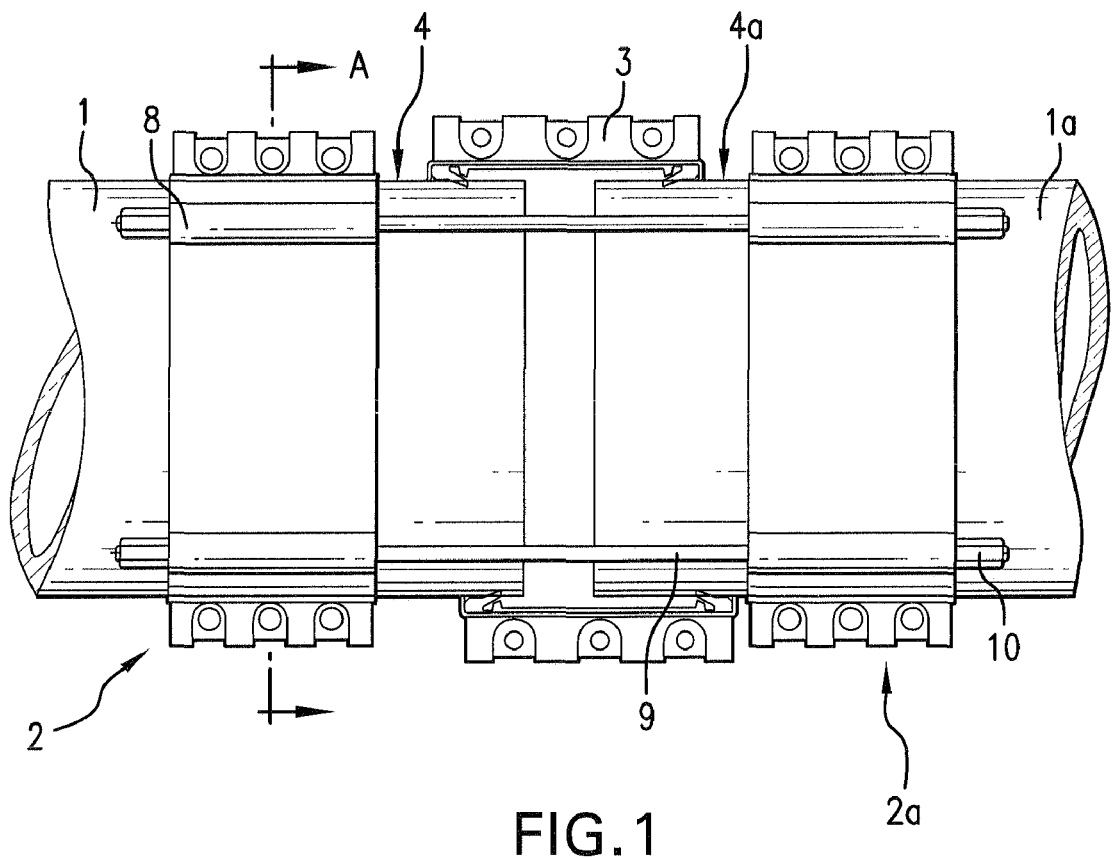
FIG. 1 is a side view of the fastening assembly which constitutes the splicing system described wherein, by way of illustration, the correct position of the upper half of the watertight connecting flange has been drawn, while the lower half thereof has been drawn displaced until running into the fastening element of the double flange situated in that area.

In the event that, due to a phenomenon of expansion/contraction, the watertight connecting flange -3- will move, as represented in FIG. 1, in the position indicated of the lower part of said flange, the movement thereof would be limited by the running into the fastening element -2*a*- of the double flange, which, joined to the other element -2- by the connecting rods -9-, has remained and will remain immobile, without being displaced.

The watertight connecting flange -3-, displaced due to expansion, as observed in the lower part of FIG. 1, will not leave the spliced area uncovered at any time between the ends -4- and -4*a*- of the pipes, thereby eliminating any danger of loss of watertightness and, consequently, risk of leakage.

In the event of a contraction due to decrease in temperature, neither will the watertight connecting flange -3- be displaced excessively thanks to the limiting action of the connecting rods -9-, which keep the fastening elements -2- and -2*a*- immobile.

Finally, the exterior clasp -5- of each one of the elements -2- and -2*a*- which compose the double flange, basic assembly of the system object of this invention, positions in its interior and around the external face of the corresponding pipe the fastening profile -11- constituted by a rectangular metal sheet, which can be coiled as indicated around the pipe, provided with a series of projections of truncated conical appearance -12-, achieved by means of a simultaneous punching and deep drawing action, which will be situated on the internal face of the fastening profile -11-, against the external face of the piping, so that upon tightening the pressure screws -6- of the exterior clasp -5- this fastening profile -11- remains completely pressed against the piping and the projections -12- practically driven into the surface thereof, featuring a suitable and sufficient fastening in order to avoid any displacement.

This fastening profile -11- remains, in turn, perfectly positioned under the entire exterior clasp -5-, once coiled around the corresponding pipe, thanks to the action of the edges in a right angle -13- which have and outline said exterior clasp -5- on both sides and all around it.

Having sufficiently described the basic characteristics of the system object of the present invention, it must be stated that its application, always in piping of equal diameter to be spliced can be performed with two polyethylene pipes, as well as if one of them is metal or of another material suitable for the conducting of the abovementioned fluids. Any variation in materials, shapes, sizes, and external appearance of the double flange and its components will not alter the essential nature of the invention, or the types of material used in its construction. Said essential characteristics will be summarised in the claims below.

It will be understood that each of the elements described above, or two or more together, may also find a useful application in other types of constructions differing from the types described above.

While the invention has been illustrated and described as embodied in a security splicing system of aligned pipes, against the expansion and/or contraction thereof, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Security splicing system of aligned pipes against expansion and/or contraction thereof, comprising two identical fastening elements (2) and (2*a*) disposable on an outer face of ends of the two pipes (1) and (1*a*), wherein both fastening elements (2) and (2*a*) are joined together; and a watertight coupling flange (3) disposable water-tightly on connecting zones (4) and (4*a*) opposite one another without a connection with the fastening elements (2) and (2*a*), wherein the two fastening elements (2) and (2*a*) are separated from one another at a fixed distance greater than a length of the watertight coupling flange (3) but less than a distance that would allow an axial displacement of said watertight coupling flange (3) to expose the connecting zones (4) and (4*a*), thus allowing the displacement of the watertight coupling flange (3) on the connecting zones (4) and (4*a*) during contractions and expansions of the two pipes (1) and (1*a*) but without loss of watertightness during the expansion and/or contraction of said pipes (1) and (1*a*), wherein each of the two fastening elements (2) and (2*a*) is formed by an exterior clamp (5) joined by pressure screws (6) attached to one or more corresponding closures (7), said exterior clamp (5) having exterior hollow cylinders (8) located longitudinally parallel to each other and to a common axis of the pipes (1) and (1*a*), inside of which are disposed coupling rods (9) that join both fastening elements (2) and (2*a*) at a pre-established distance without separating or being displaced, wherein said cylinders (8) have an identical shape, quantity, and position and are located in a same angular branching in both fastening elements (2) and (2*a*), wherein under the exterior clamp (5) of each fastening element (2) and (2*a*) of the double flange, a fastening profile (11) remains completely coiled around an exterior surface of the pipes (1) and (1*a*) along with its exterior clamp (5), wherein the fastening profile consists of a rectangular metal sheet provided with a series of truncated cone-shaped projections formed by a simultaneously punching and drawing action and disposed on a contact face of the pipes (1) and (1*a*) in such a way that they are drivable into its surface when the exterior clamp (5) is tightened to achieve a sufficient immobile fastening, and both edges of the fastening profile being folded at a right angle (13) so as to center the fastening profile on the inner periphery of the clamp (5).

2. Security splicing system of aligned pipes against expansion and/or contraction thereof as defined in claim 1, wherein the coupling rods (9) are cylindrical and smooth, with their ends (9*a*) threaded and projecting beyond the cylinders (8), thus enabling a placement of hold-down nuts (10) on said threaded ends which, when locking against the cylinders (8), fix a relative position of both fastening elements (2) and (2*a*).

* * * * *